INVENTOR.
Marcel A. Pahlavan
BY
ATTORNEYS

United States Patent Office 3,487,263
Patented Dec. 30, 1969

1

3,487,263
DISPLAY DEVICE WITH SEPARATE MEANS FOR DEFINING AND POSITIONING THE SYMBOL
Marcel A. Pahlavan, Los Angeles, Calif., assignor to Aerospace Products Research Corporation, Santa Monica, Calif., a corporation of California
Filed July 18, 1966, Ser. No. 565,981
Int. Cl. H05b 37/02
U.S. Cl. 315—174
14 Claims

ABSTRACT OF THE DISCLOSURE

Solid state apparatus for displaying patterns whose size and position can be selectively varied. The apparatus is comprised of a display structure and control circuitry therefor. The structure includes illuminable material sandwiched between front and rear segmented electrodes. The control circuitry includes electrically controlable switches, each connected to a different electrode area. A different threshold level is preferably established at each of the switches such that as the magnitude of the input signal applied to all of the switches is increased, the switches will successively switch to a current conducting state so as to apply an energizing signal to the electrode areas connected thereto. Thus, by increasing the input signal magnitude, the number of switches, and thus the size of the pattern display, is increased.

This invention relates generally to solid state display apparatus and more particularly to inexpensive apparatus for displaying patterns whose size and position can be selectively varied.

U.S. patent application Ser. No. 527,424 filed Feb. 15, 1966, and assigned to the same assignee as the present application discloses a solid state apparatus for displaying arbitrary patterns whose physical movement can be simulated. In a preferred embodiment disclosed therein, electroluminescent elements are employed which, in response to the application of an alternating signal thereto, will glow. The display apparatus structure preferably includes a piece of illuminable material sandwiched between a rear electrode segmented to define a plurality of areas and a front electrode segmented to define a lesser number of areas, each front electrode area overlaying two or more rear electrode areas. When an alternating signal is applied across areas of the front and rear electrodes, the illuminable material therebetween glows. Encoding matrices connect opposite terminals of an alternating signal source to the front and rear electrodes for steering the alternating signal to selected areas to define desired patterns at desired positions. By properly controlling the encoding matrices, the physical movement of the patterns can be simulated.

The present invention is directed to a display apparatus employing a physical structure similar to that disclosed in the aforecited patent application but control circuitry different from that disclosed therein. More particularly, in accordance with the present invention, control circuitry is provided which easily enables both the size and position of displayed patterns to be controlled in response to the application of suitable control signals.

Briefly, in accordance with the present invention, an electrically controllable switch (e.g. a silicon controlled switch or a transistor) is connected to each of a plurality of areas defined on a front (or rear) electrode. Each of the switches can be selectively switched to a current conducting state in response to an input signal applied thereto exceeding a threshold level established thereat. More particularly, a different threshold level is preferably established at each of the switches such that as the magni-

2 tude of the input signal applied to all of the switches is increased, the switches will successively switch to a current conducting state thereby applying an alternating signal to the electrode areas connected thereto. Thus, by increasing the input signal magnitude, the number of switches, and thus the size of the pattern displayed, is increased.

In accordance with a significant feature of the present invention, the threshold level at each of the switches is established by a tap connected to a string of serially connected nonlinear impedance devices connected across a direct current potential. Thus, for a particular input signal magnitude, a certain number of switch threshold levels will be exceeded and a corresponding number of display areas will be illuminated.

In accordance with a further feature of the present invention, switch means are provided for selectively eliminating portions of the string of nonlinear impedance devices. In this manner the position of the displayed pattern can be selectively varied.

In accordance with a still further feature of the invention, a common set of switches can be used to control several groups of front electrode areas with additional control being exercised over the rear electrode in order to determine the paticular areas to be illuminated.

The novel features that are considered characteristic of this invention are set forth with particularity in the appended claims. The invention will best be understood from the following description when read in connection with the accompanying drawings, in which:

FIGURE 1 schematically illustrates a bar graph display pattern and shows the size of the pattern being varied;

FIGURE 2 schematically illustrates a unit length display pattern and shows the position, rather than the size, of the pattern being varied;

FIGURE 3 schematically illustrates a display pattern and shows both the size and position of the pattern being varied;

FIGURE 4 schematically illustrates a fixed length display pattern being rotated or recirculated through a group of display elements;

Figure 1:
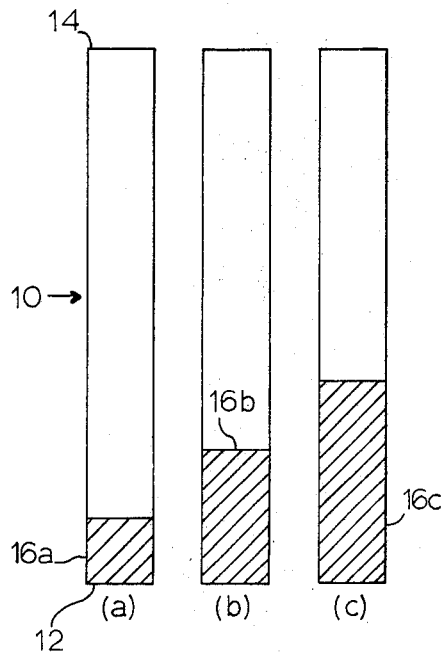

Attention is now called to FIGURE 1 of the drawings which schematically illustrates a display apparatus displaying a bar graph pattern, for example. The display apparatus defines a scale 10 having a lower limit 12 and an upper limit 14. FIGURE 1(a) illustrates a unit length pattern 16a positioned at the lower scale limit 12. FIGURE 1(b) illustrates a display pattern 16b which is larger than the pattern 16a but which is similarly positioned; i.e. it still extends from the lower scale limit 12. FIGURE 1(c) illustrates a still larger pattern 16c which, however, is also similarly positioned. It should be appreciated that a display apparatus of the type shown in FIGURE 1 can be conveniently used to represent various measured quantities such as voltage, temperature, pressure, etc.

Whereas the position of the patterns shown in FIG-

Figure 2:
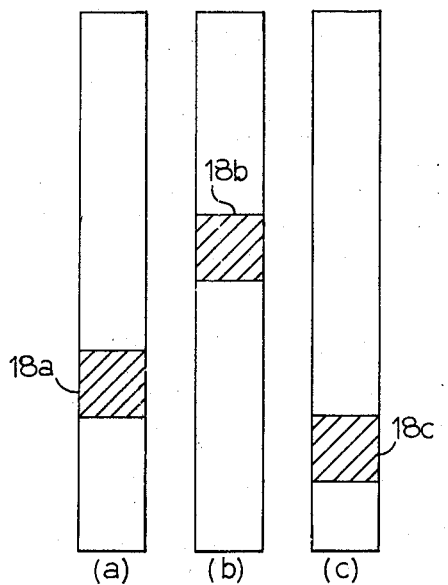

URE 1 remains the same (i.e. the bottom of the pattern is fixed to the lower scale limit 12) as the size of the patterns is varied, it is sometimes desirable to be able to vary the position of the pattern along the scale 10 without varying the size. For example, note in FIGURE 2(a) that a unit length pattern 18a is positioned two increments above the lowest scale position. Note in FIGURE 2(b) that the pattern 18b is positioned four increments above the lowest position and in FIGURE 2(c), one increment above the lowest position. It should be appreciated that displays of the types respectively shown in FIGURES 1 and 2 can often be used interchangeably and the particular choice would depend upon the particular application.

Figure 3:
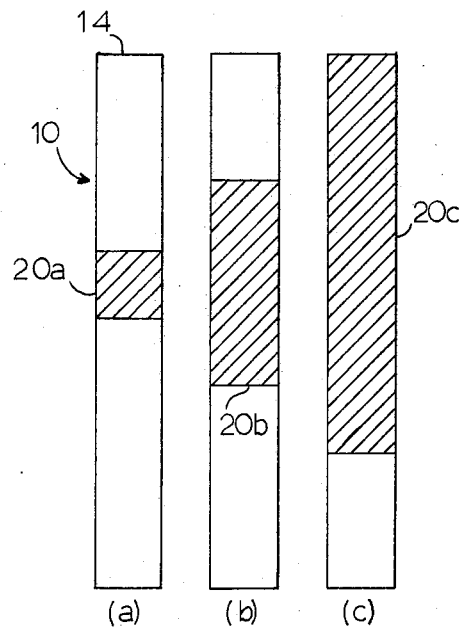

FIGURE 3 schematically illustrates a still further type of display apparatus in which both the size and position of the display pattern 20 can be varied. More particularly, note in FIGURE 3(a) that a unit length display pattern 20 is positioned four increments above the lowest scale position. Note in FIGURE 3(b) a three unit length display pattern 20b is positioned three increments above the lowest scale position. FIGURE 3(c) illustrates a six unit length pattern positioned two increments above the lowest scale position. Thus, it should be appreciated that the type of display shown in FIGURE 3 can vary both the size and position of the display pattern and therefore each pattern can effectively represent two distinct parameters if desired.

Figure 4:
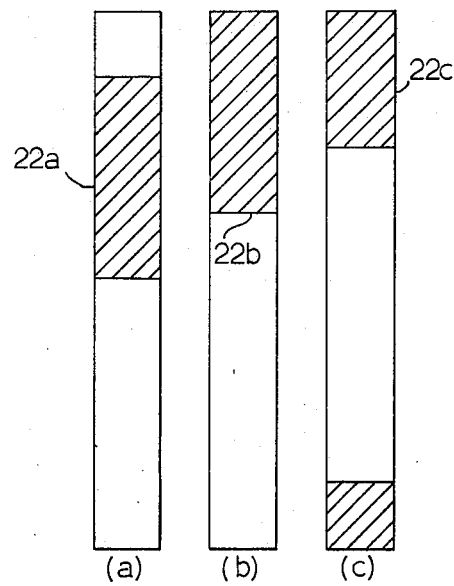

FIGURE 4 schematically illustrates a still further type of display apparatus in which a display pattern 22 can be rotated or recirculated. That is, as shown in FIGURE 4(a), the pattern 22a is one increment below the upper scale position. In FIGURE 4(b) the pattern 22b has reached the upper scale position and in FIGURE 4(c) the pattern 22c has overflowed the upper scale position and has recirculated so that the top of the pattern appears in the lower scale position. Although for simplicity FIGURE 4 illustrates the pattern as being of fixed length, it need not be. That is, the pattern length can also be varied as shown in FIGURE 3.

Figure 5:
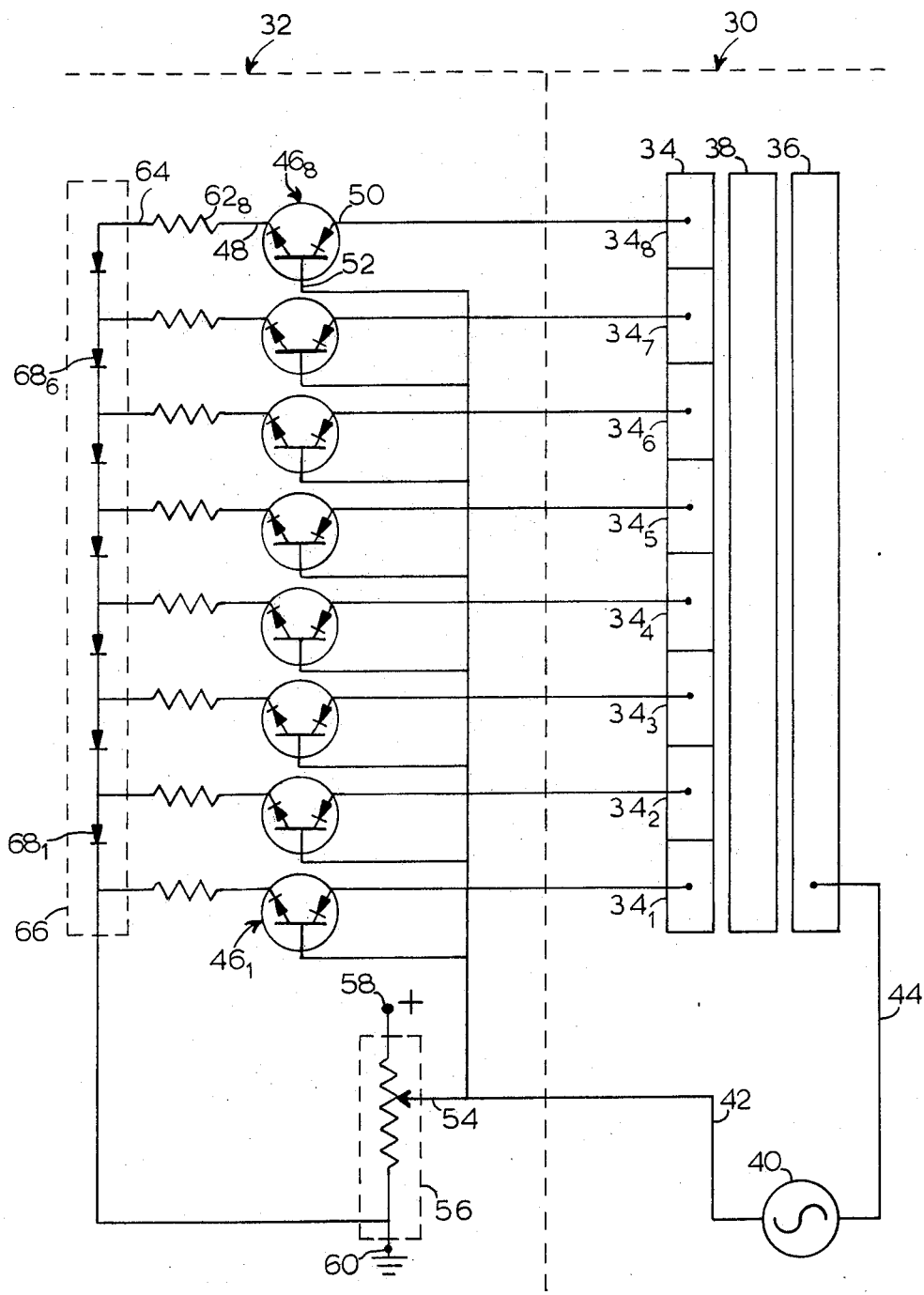
FIGURE 5 is a schematic diagram of a first display apparatus embodiment capable of displaying patterns as shown in FIGURE 1.

A relatively simple and inexpensive apparatus for displaying patterns of the type shown in FIGURE 1, is illustrated in FIGURE 5. The apparatus of FIGURE 5 can be considered as being generally comprised of a display structure 30 and display circuitry 32. More particularly, the display structure 30 is preferably comprised of a plurality of display elements formed from a sandwich including a front transparent electrode 34 formed of conductive glass, a rear opaque silver coated electrode 36, and a piece of illuminable material 38, such as phosphor in a dielectric medium, therebetween. The front electrode 34 is scribed to define a plurality of electrically isolated areas 34 each forming part of a different display element. Although FIGURE 5 illustrates eight different areas ($34_1$–$34_8$), it should be appreciated that virtually any number of areas can be provided. The size of the areas is not significant except, however, it is pointed out that very small areas can be defined if desired having a height on the order of .005 inch if desired.

As is well known in the art, if an alternating signal having a sufficient voltage is applied between the electrode 36 and one of the areas of electrode 34, the illuminable material 38 therebetween will glow. In order to energize the display structure 30, an appropriate alternating signal source 40 is provided. The alternating signal source 40 has a first terminal 42 which is connected through the display circuitry 32 to each of the areas of electrode 34. In addition, the alternating current source 40 has a second terminal 44 which is connected to the second electrode 36.

The display circuitry 32 is comprised of a plurality of switches $46_1$–$46_8$ each connecting the first terminal 42 of the alternating current source 40 to a different one of the areas of the electrode 34. Each of the switches 46 is capable of defining a conducting and a nonconducting state in response to the application of appropriate input signals thereto.

More particularly, each of the switches 46 is illustrated as comprising a semiconductor device such as a silicon controlled rectifier or a silicon controlled switch. Such a device comprises a four layer semiconductor device having at least three exposed terminals which will be respectively referred to as a cathode 48, an anode 50, and a gate 52. The anode 50 of each of the switches 46 is connected to a different one of the areas of electrode 34. The gates 52 are all connected in common to the first terminal 42 of alternating current source 40. In addition, the gates 52 are connected in common to the output terminal 54 of an input signal source 56. The source 56 is illustrated as comprising a potentiometer connected between a positive potential direct current terminal 58 and a ground terminal 60. The output terminal 54 is shown as the movable arm of the potentiometer of source 56.

Each of the cathodes 48 is connected through a current limiting resistor 62 to a different tap 64 of a threshold establishing circuit 66. More particularly, as shown in FIGURE 5, the threshold establishing circuit 66 is comprised of a plurality of nonlinear impedance devices such as diodes 68. The circuit 66 is connected between the ground terminal 60 and the current limiting resistor $62_8$.

Prior to considering the operation of the circuit of FIGURE 5, it is pointed out that the silicon controlled switches 46 illustrated in FIGURE 5 are responsive to a sufficient direct current forward potential applied across the control junction thereof, i.e. between the gate 52 and cathode 48 to pass alternating current through the load current junction, i.e. the gate to anode. More particularly, utilizing a typical silicon controlled switch, in response to the application of 0.7 volt from the gate to the cathode, alternating current can be conducted through the gate-anode junction. In considering the operation, initially assume that the arm 54 is located at the end of the potentiometer close to the ground terminal 60. As a consequence, none of the gate to cathode junctions of the switches 46 will be forward biased and therefore alternating current will not be conducted through any of the switches 46. Thus, no portions of the illuminable material 38 will be energized.

Now assume that the arm 54 starts moving up the potentiometer toward the positive terminal 58. When the potential available on arm 54 exceeds the potential required to forward bias the control junction of the switch 46, it will switch to a current conducting state thereby conducting an alternating signal from source 40 through the portion of the illuminable material 38 adjacent area $34_1$. The switch $46_2$ will not at this time switch to the conducting state due to the diode $68_1$ connected between its cathode and the ground terminal 60. That is, in order for the switch $46_2$ to switch to a current conducting state, the potential applied to the gate thereof must not only forward bias its gate-cathode junction but in addition must forward bias the diode $68_1$. Thus, the arm 54 must be moved further toward the positive potential terminal 58 in order to switch the switch $46_2$ to the conducting state. Accordingly, it should be apparent that as the arm 54 is moved along the potentiometer from terminal 60 toward terminal 58, the switches 46 will successively switch to a conducting state as the potential applied to the gates thereof breaks down both the switch control junctions and the diodes in series therewith.

Figure 6:
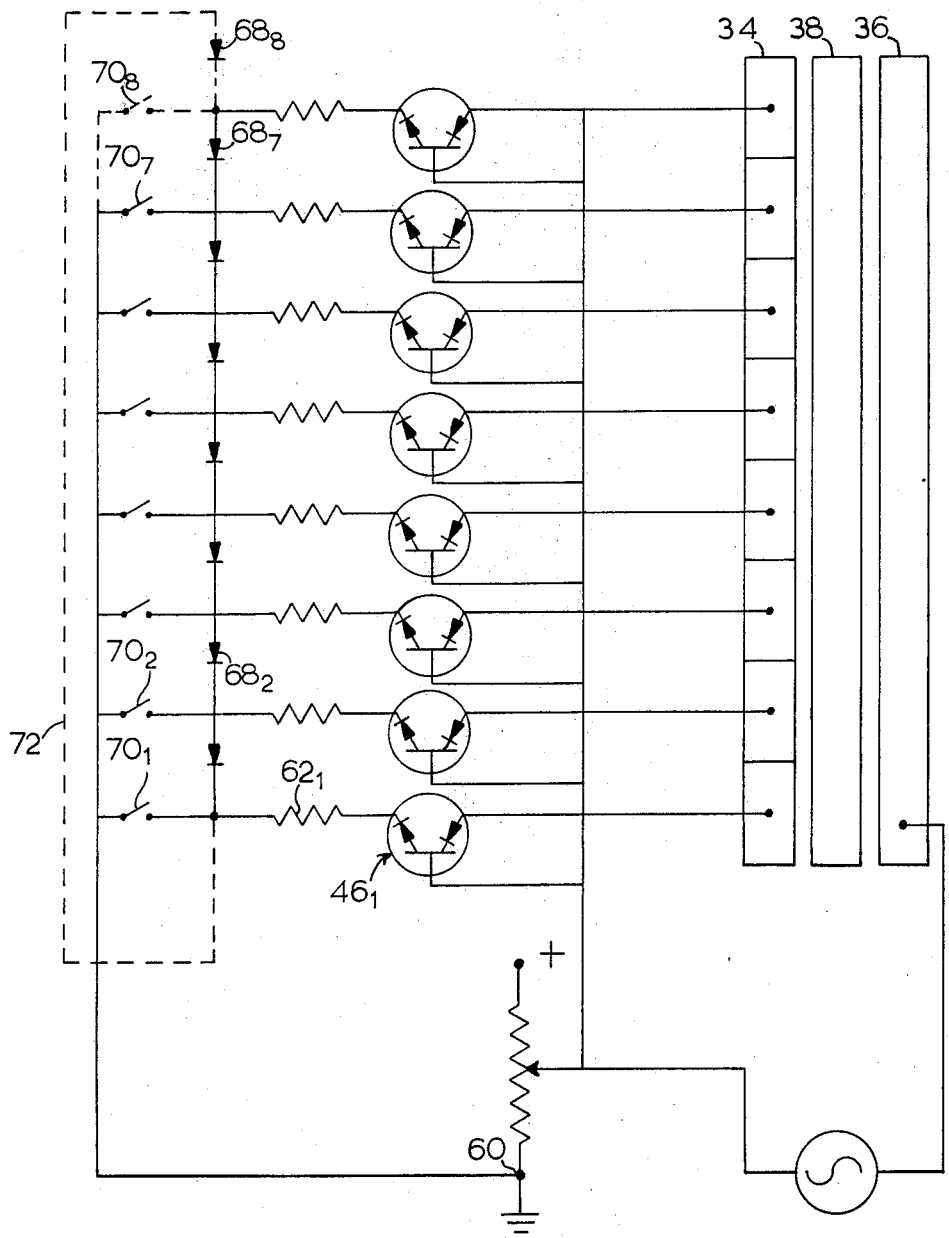
FIGURE 6 is a schematic diagram of a second display apparatus embodiment capable of displaying patterns as shown in FIGURES 3 and 4.

Attention is now called to FIGURE 6 and initially to only those portions illustrated in solid (rather than dotted) lines. It will be appreciated that the circuit arrangement illustrated in FIGURE 6 is very similar to that illustrated in FIGURE 5 except however that the cathode of each of the diodes 68 (shown in solid line) is connected through a different one of the switches $70_1$–$70_7$ to the ground terminal 60. More particularly, whereas in FIGURE 5 only the cathode of the lowermost diode $68_1$ was connected to the ground terminal 60, in accordance with the circuit arrangement of FIGURE 6, the cathode of each of the diodes 68 is connected through an individually actuatable switch 70 to the ground terminal 60. By controlling the switches 70, the position of the display pattern can be established.

More particularly, assume that all of the switches 70 are open except for the switch $70_1$. With this switch configuration, the circuit of FIGURE 6 will be electrically identical to that of FIGURE 5. Assume now that switch $70_1$ is opened and that switch $70_2$ is then closed. With this switch configuration, it would be impossible to force switch $46_1$ to a conducting state. Accordingly, the lower limit of the display pattern would be defined by area $34_2$.

From the foregoing, it should be appreciated that the magnitude of the potential provided by source 56 on output terminal 54 determines the number of switches 46 which switch to a current conducting state and the configuration of switches 70 determines the position of those switches which switch to the current conducting state. Therefore, whereas the embodiment of FIGURE 5 is able to produce display patterns as shown in FIGURE 1, the embodiment of FIGURE 6 is able to produce display patterns as shown in FIGURE 3 in which both the size and position of the display patterns can be selectively varied. In order to enable the apparatus of FIGURE 6 to recirculate patterns as depicted in FIGURE 4, the circuit portions shown in dotted lines are employed. More particularly, the cathode of diode $68_1$ is connected through conductor 72 to the anode of diode $68_8$. The cathode of diode $68_8$ is connected to the anode of diode $68_7$ and to switch $70_8$. As a consequence, after switch $46_8$ becomes conductive, if the potential on arm 54 increases further, switch $46_1$ will next become conductive by forward biasing diode $68_8$. Thus, the display pattern can be caused to recirculate as depicted in FIGURE 4. A recirculating type of display is very useful in order to simulate a physically moving endless tape, for example.

Figure 7:
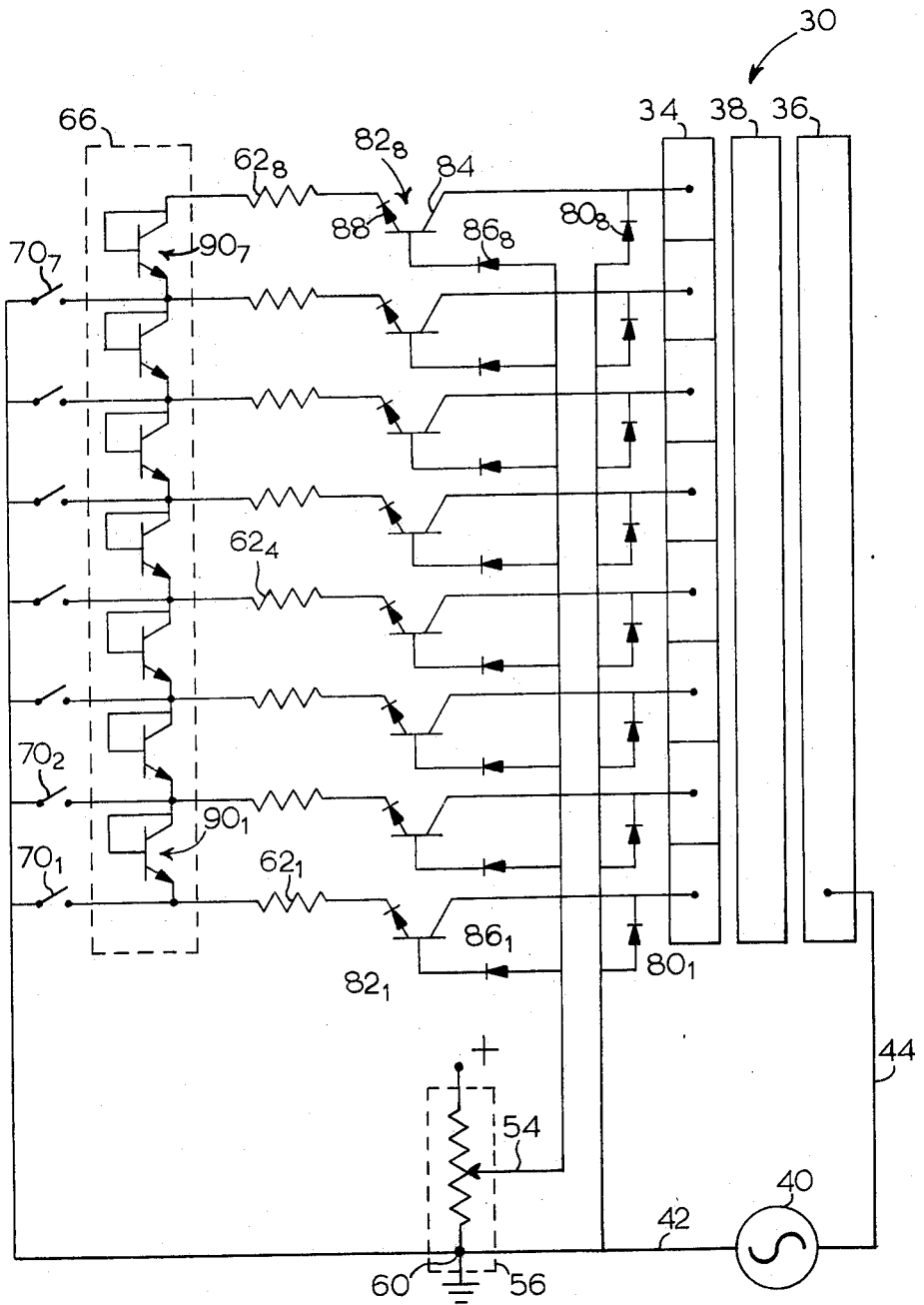
FIGURE 7 is a schematic diagram of a third display apparatus embodiment capable of displaying patterns as shown in FIGURE 3.

Attention is now called to FIGURE 7 which illustrates an alternative embodiment of the invention in which transistor switches are utilized to control current flow through the display structure 30 rather than the silicon controlled switches as shown in FIGURES 5 and 6. More particularly, in FIGURE 7, the second terminal 44 of source 40 is connected to the rear electrode 36. The first terminal 42 is connected directly to each of the areas of front electrode 34 through different diodes 80. Thus, the alternating current path from terminal 42 to terminal 44 through the display structure is through the diodes 80. The return path from terminal 44 to terminal 42, on the other hand, is through one of the transistors switches $82_1$–$82_8$. More particularly, each of the areas of the electrode 34 is connected to the collector 84 of a different one of the transistors 82. The base of each of the transistors 82 is connected through a diode 86 to output terminal 54 of source 56. The emitter of each of the transistors 82 is connected through a current limiting resistor 62 to a different tap on a threshold establishing circuit 66. The threshold establishing circuit 66 shown in FIGURE 7 utilizes transistors 90, each having its base and collector interconnected, as the nonlinear impedance devices in lieu of the diodes 68 as shown in FIGURES 5 and 6. As is known in the art, a transistor 90 connected as illustrated in FIGURE 7 exhibits a characteristic similar to, but sharper than, the characteristic of a conventional diode. Aside from this slight difference in characteristic, however, it should be appreciated that the diodes 68 of FIGURES 5 and 6 and the transistors 90 of FIGURE 7 are readily interchangeable.

The emitters of the transistors 90 are connected through switches 70 to ground terminal 60. The embodiment of FIGURE 7 operates substantially identical to the embodiment of FIGURE 6. That is, in order to define one of the areas of electrode 34 as the lowermost display pattern area, the switch 70 associated therewith is closed. The potential appearing on output terminal 54 then determines the number of areas including and above the area associated with the closed switch 70 which will be energized. For the sake of simplicity, the path 72 illustrated in FIGURE 6 for enabling a display pattern to be recirculated has not been shown in FIGURE 7. However, it should be appreciated that the embodiment of FIGURE 7 can be similarly modified to permit recirculation.

Figure 8:
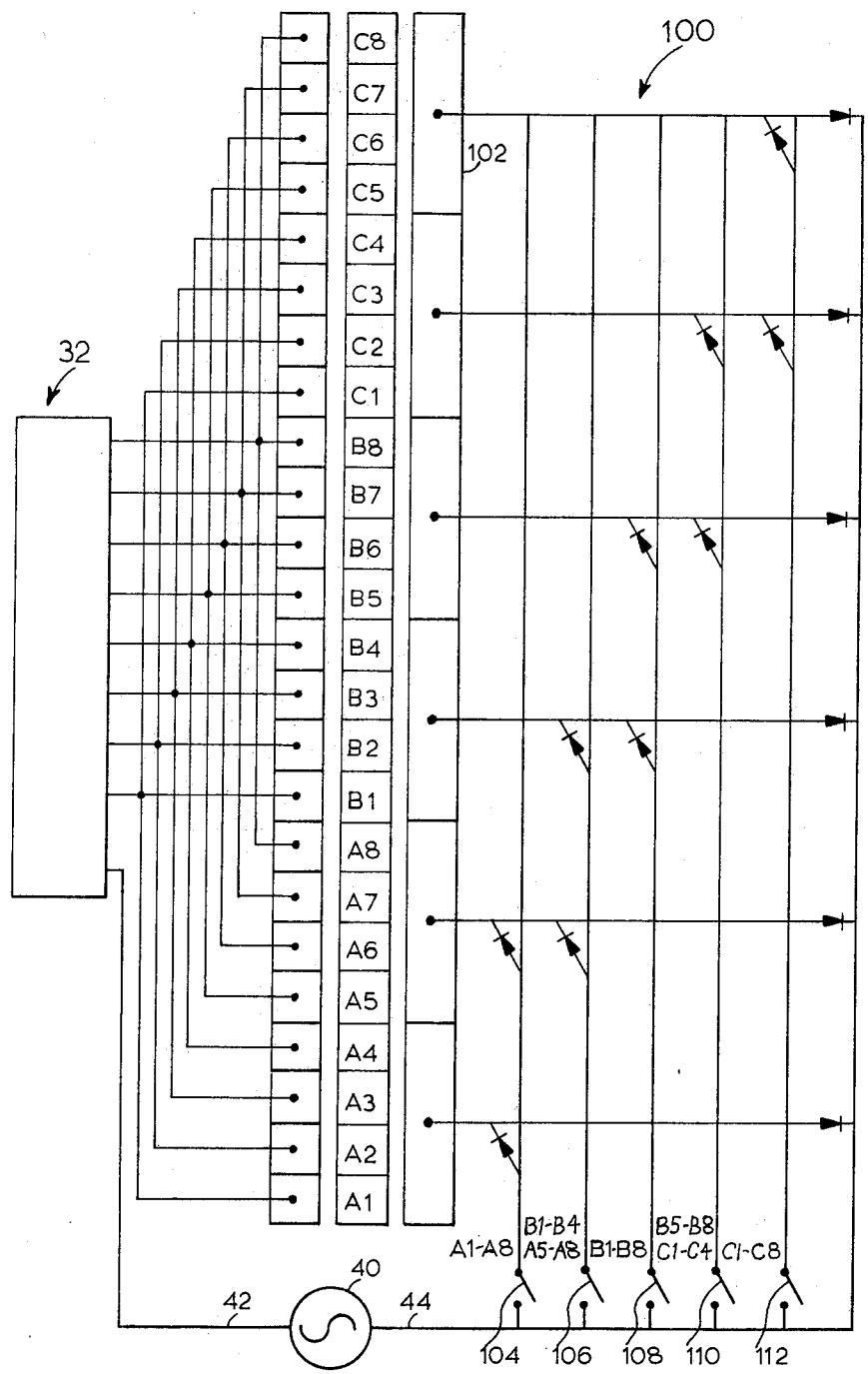
FIGURE 8 is a schematic diagram illustrating the manner in which control circuitry of the type shown in FIGURES 4, 5, and 6 can be utilized to control more than one group of display areas.

Attention is now called to FIGURE 8 which illustrates a display apparatus in which the control circuitry 32 is shared between different groups of display areas. More particularly, it has in the embodiments thus far described, been assumed that the front electrode is segmented into eight areas and as a consequence the display circuitry 32 has been provided with eight switches each of which controls a different one of the areas. It has been pointed out that any number of electrode areas can be provided with the number of switches in the control circuitry 32 being selected so that a different switch (i.e. 46 or 82) is provided for each area. Thus, if one hundred display areas are desired, the display circuitry 32, in accordance with the embodiments of FIGURES 5–7, would include one hundred switches.

In order to reduce the number of switches required, the display circuitry 32 can control several identical groups of areas as shown in FIGURE 8. More particularly, FIGURE 8 illustrates the display structure as being comprised of three groups (i.e. group A, group B, group C) each of which is identical and includes eight areas. As shown in FIGURE 8, the display circuitry 32 is identically connected to the areas of each of these groups. If the rear electrode of the display structure shown in FIGURE 8 were directly connected to the second terminal 44 of the alternating signal source 40, then regardless of what pattern was defined by the display circuitry switches, all of the groups would display the same patterns. In order to enable the selective energization of certain groups, the rear electrode is segmented and coupled to the terminal 44 through a diode matrix 100. Thus note that the rear electrode includes a plurality of sections 102 each of which overlays four different areas on the front electrode. By selectively closing switches 104, 106, 108, 110, 112, any group of eight adjacent areas can be selected for energization. Thus, if switch 104 is closed, for example, the display pattern will appear somewhere in group A. On the other hand, if switch 104 is open and switch 106 is closed, then the display pattern will appear somewhere in the group of eight adjacent areas between areas A5–8 and areas B1–4. Similarly, if switch 108 is closed and all of the other switches are open, then the display pattern will appear in the areas of group C.

From the foregoing, it should be appreciated that a display apparatus has been provided herein which enables display patterns to be defined whose size and position can both be varied in accordance with input signals. Although little has been said about the nature of the input signals, it should be appreciated that the specific nature of the signals is not important and that embodiments of the invention can be suitably operated with various types of signals. Thus the essentially analog voltage applied to terminal 54 can be derived from any suitable signal source as can the essentially digital control signals for controlling switches 70. It should also be appreciated that although preferred types of switches are illustrated herein, it is recognized that various other switching arrangements can be employed for controlling the display structures in substantially the same manner as defined herein. Similarly, it is recognized that other types of threshold establishing circuits can be employed in place of the preferred circuit arrangements shown herein. Moreover, it should also be understood that although the apparatus specifically shown herein is capable of moving display patterns in only one dimension (e.g. vertically, Y), the concepts of the invention are equally applicable to two dimensional (X, Y) display apparatus in which the display pattern has freedom in two perpendicular directions. Thus, for example, both the height and width of a displayed character can be varied. By masking certain display elements (as is shown, for example, in the aforecited patent application) arbitrary characters can be displayed.

What is claimed is:

1. A display apparatus including:
    a first electrode defining a first group of areas;
    a second electrode;
    an illuminable material sandwiched between said first and second electrodes;
    an alternating signal source having first and second terminals;
    a first means connecting said first terminal to said first group of areas;
    a second means connecting said second terminal to said second electrode;
    said first means including a plurality of switches each capable of defining a first conducting state and a second nonconducting state;
    means connecting each of said switches between said first terminal and a different one of said areas;
    control means for switching selected ones of said switches to said first state, said control means including a source providing a control signal;
    means for different threshold switching levels at each of said switches; and
    means for applying said control signal to said switches such that each of said switches will switch to said first conducting state in response to said control signal exceeding the threshold switching level established thereat.

2. The apparatus of claim 1 wherein said means for establishing different threshold switching levels includes means for varying said threshold switching signals.

3. The apparatus of claim 1 wherein said means for establishing different threshold switching levels at each of said switches includes a circuit comprised of a plurality of serially connected nonlinear impedances;
    a plurality of taps each connected between a different one of said switches and a different point in said circuit; and
    means for selectively connecting one of said circuit points to a source of reference potential.

4. The apparatus of claim 3 wherein said nonlinear impedances comprise diodes.

5. The apparatus of claim 3 wherein said nonlinear impedances comprise transistors each having a base, a collector and an emitter; and
    means interconnecting the base and collector of each of said transistors.

6. The apparatus of claim 1 wherein each of said switches comprises a semiconductor device.

7. The apparatus of claim 6 wherein each of said semiconductor devices defines a control junction and a load current junction;
    means connecting said load current junctions between said first terminal and said areas; and
    means for applying said threshold switching levels and said control signal across said control junctions.

8. The apparatus of claim 6 wherein each of said semiconductor devices comprises a transistor responsive to a predetermined signal difference applied across the control junction thereof for conducting current in a first direction through the load current junction thereof and the area connected thereto; and
    means connected said alternating signal source to each of said areas for conducting current in a second direction therethrough.

9. The apparatus of claim 6 wherein each of said semiconductor devices is responsive to a predetermined signal difference applied across the control junction thereof for conducting current in first and second directions through the load current junction thereof and the area connected thereto.

10. The apparatus of claim 1 wherein said first electrode defines a second group of areas;
    means connecting said first means to said second group of areas;
    said second electrode defining a plurality of sections each overlying a different set of first electrode areas; and
    switch means included in said second means for selectively connecting said second electrode sections to said second terminal.

11. A display apparatus including:
    a plurality of contiguous individually illuminable display elements;
    a source providing a first signal;
    a source providing a second signal;
    means responsive to said first signal for illuminating a number of display elements to define a symbol; and
    means responsive to said second signal for defining the position of said symbol.

12. The apparatus of claim 11 wherein said means responsive to said first signal includes means responsive to the magnitude thereof for determining the number of elements to illuminate.

13. The apparatus of claim 11 wherein said means responsive to said second signal includes a plurality of switches; and wherein
    said second signal is able to uniquely identify each of said switches.

14. The apparatus of claim 11 including means for recirculating said symbol through said plurality of display elements.

References Cited

UNITED STATES PATENTS

| 3,083,262 | 3/1963 | Hanlet | 188—7.1 |
| 3,242,482 | 3/1966 | Simon | 340—378 |
| 3,280,341 | 10/1966 | DuVall | 315—169 |
| 3,262,010 | 7/1966 | Kazan | 315—169 X |

JAMES W. LAWRENCE, Primary Examiner

C. R. CAMPBELL, Assistant Examiner

U.S. Cl. X.R.

313—108, 109.5; 315—169, 175; 340—166, 378